United States Patent
Kowalski

(10) Patent No.: US 7,192,289 B2
(45) Date of Patent: Mar. 20, 2007

(54) MODULE WITH INTERCONNECTED MALE POWER INPUT RECEPTACLE, FEMALE POWER OUTPUT RECEPTABLE AND FEMALE LOAD RECEPTABLE

(76) Inventor: Robert S. Kowalski, 148 Alfonso Dr., Rochester, NY (US) 14626

( * ) Notice: Subject to any disclaimer, the term of this patent is extended or adjusted under 35 U.S.C. 154(b) by 0 days.

(21) Appl. No.: 10/797,263

(22) Filed: Mar. 10, 2004

(65) Prior Publication Data

US 2005/0201190 A1 Sep. 15, 2005

(51) Int. Cl.
H01R 13/648 (2006.01)
H01R 4/64 (2006.01)

(52) U.S. Cl. ...................................... 439/106
(58) Field of Classification Search ............... 439/105, 439/107, 209, 210, 211, 535, 650, 651, 652, 439/188
See application file for complete search history.

(56) References Cited

U.S. PATENT DOCUMENTS

| | | |
|---|---|---|
| 3,715,627 A | 2/1973 | D'Ausilio |
| 4,717,357 A | 1/1988 | Greenwood |
| 4,740,167 A | 4/1988 | Millhimes et al. |
| 4,775,802 A | 10/1988 | Dods |
| 4,875,871 A | 10/1989 | Booty, Sr. et al. |
| 5,096,431 A * | 3/1992 | Byrne ........................ 439/171 |
| 5,178,555 A * | 1/1993 | Kilpatrick et al. .......... 439/215 |
| 5,185,499 A | 2/1993 | Yahraus |
| 5,336,097 A | 8/1994 | Williamson, Jr. et al. |
| 5,347,095 A * | 9/1994 | Zeder ....................... 200/51.09 |
| 5,675,194 A | 10/1997 | Domigan |
| 5,785,551 A | 7/1998 | Libby |
| 6,045,374 A | 4/2000 | Candeloro |
| 6,069,317 A | 5/2000 | Wagganer |
| 6,147,304 A | 11/2000 | Doherty |
| 6,392,141 B1 | 5/2002 | Smith et al. |
| 6,433,275 B1 | 8/2002 | Rittmann et al. |
| 6,491,539 B1 | 12/2002 | Johnston |
| 6,527,302 B1 | 3/2003 | Gault et al. |
| 6,540,536 B1 * | 4/2003 | Young ........................ 439/215 |
| 2005/0075007 A1 * | 4/2005 | Benoit et al. ............... 439/536 |

* cited by examiner

Primary Examiner—Chandrika Prasad
(74) Attorney, Agent, or Firm—Harter Secrest & Emery; Michael J. Didas, Esq.; Brian B. Shaw, Esq.

(57) ABSTRACT

A module system for power distribution includes sealed modules for providing control or access to the power, wherein the module system allows interconnection to a modular circuit breaker panel for monitoring power consumption and optimizing use for a given circuit.

10 Claims, 16 Drawing Sheets

MODULE WITH INTERCONNECTED MALE POWER INPUT RECEPTACLE, FEMALE POWER OUTPUT RECEPTABLE AND FEMALE LOAD RECEPTABLE

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO A "SEQUENCE LISTING"

Not applicable.

BACKGROUND OF THE INVENTION

1. Field of the Invention

The present invention relates to the wiring of commercial and residential buildings and, more particularly, to a modular wiring system wherein pre-wired and sealed modules are selectively interconnected in a unique and predetermined manner by predetermined lengths of the electrical conductors so as to provide unique receptacle interconnections of predetermined lengths of electrical conductors, from the building electric service circuit breakers, through control and power distribution modules to the electrical loads and voltage power outlets.

2. Background Art

Traditionally, the wiring of branch circuits of a typical 120 volt AC electrical power distribution system is a time-consuming and labor-intensive task. The wiring process requires the placement and attachment of every cable, junction box, plug receptacle, fixture, switch, as well as every termination of every conductor associated with each. In addition, accommodations often must be made for additional ongoing building operations in conjunction with the wiring, such as the installation of wall panels or flooring.

Traditionally, in the construction of new homes, wiring is completed in stages. For example, after the rough framing and prior to attachment of the wall panels to the framing, most or all of the power distribution cables are installed between a main service panel, or breaker panel (a service entrance coupled to the utility company), and the locations of various outlets receptacles, switches, and fixtures. Each receptacle, switch and fixture in the home is a member of a branch circuit connected to a given circuit breaker in the main service panel. The branch circuits typically encompass a plurality of receptacles, switches and/or fixtures that are related to one another by function or by general location.

U.S. Pat. No. 5,785,551 discloses a quick connect electrical box having a plurality of connectors to mate with a male plug which is easily attached to an unstripped end of an electrical cable.

U.S. Pat. No. 3,715,627 to D'Ausilio discloses a preformed, conductive, main trunk line in a plurality of offshoot lines having two or more conductive wires embedded within a molded body of insulation to enable performing of the lines for installation within a molded structure, such as plastic or concrete. Further, the preformed trunk lines and molded structures of U.S. Pat. No. 3,715,627 are fixed permanently in common locations at the time of building construction. Thus, adding or changing locations not served by the original trunk line installation would require extensive renovation of interior building surfaces, to provide the circuits required to support the added molded structures at the new locations.

However, the need remains for a system that eliminates the need for insulation stripping and wire splicing for installation. The need also exists for an easy-to-install system which can be readily mounted and provide a convenient method of forming circuit breaker parallel circuits in any desired building location, while maintaining a predetermined orientation or continuity between electrical connections.

BRIEF SUMMARY OF THE INVENTION

The present invention provides a system for installing and distributing electrical control and power in buildings. The present system allows an efficient installation providing energy and resource savings, while maintaining predetermined continuity of connectors within the system. The present system also optionally provides for a low voltage system for controlling relays, so as to replace existing high voltage power devices.

The present invention provides a system of prefabricated electrical hardware and encapsulated modules. The system also provides an alternative to the existing onsite assembly of electrical switch boxes, while removing the previously required wire stripping and splicing.

The modules of the present invention are prefabricated assemblies, each module containing the electrical and mechanical components and associated circuitry to provide the designated function of the module. Operable interconnection of the module is accomplished by merely interconnecting the conductor having a preformed mating receptacle, wherein the receptacle configuration insures electrical polarity from a circuit breaker panel to an end point such as a load or power outlet.

In one configuration, all the housings encapsulating the electrically conductive elements are made from electrically non-conductive material to reduce exposure to electrical potential.

In a further preferred configuration, the conductors are prefabricated with a male connector receptacle at one end and a corresponding female connector receptacle at a second end, wherein the prefabricated conductors are manufactured in standard lengths. As each individual element of the system is equipped with a conductor receptacle, the system allows for installation through a manual plug-in process from the circuit breaker to the point of consumption or use.

BRIEF DESCRIPTION OF THE SEVERAL VIEWS OF THE DRAWING(S)

DETAILED DESCRIPTION OF THE INVENTION

Figure 1:
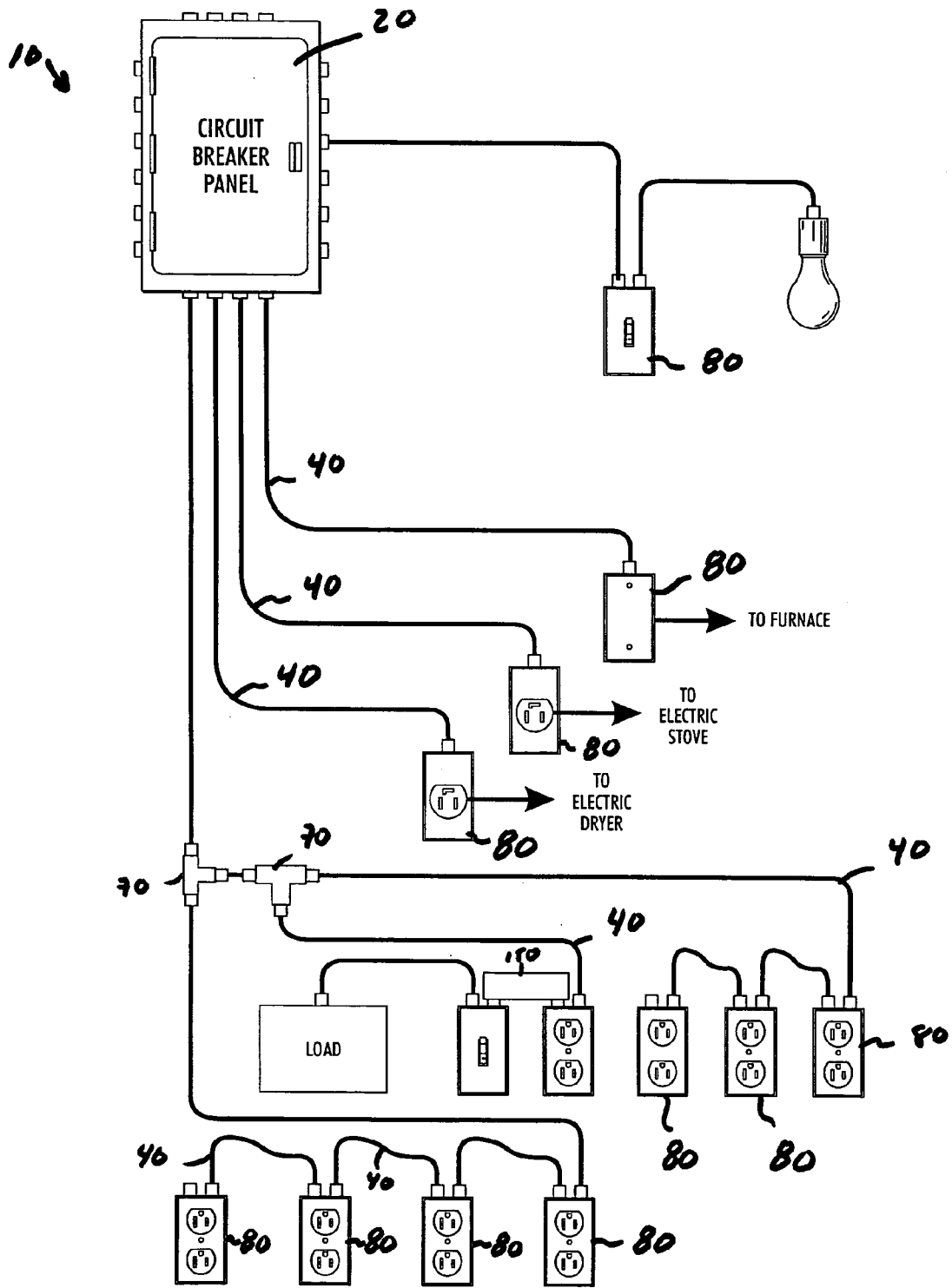
FIG. 1 is a schematic view of the modular electrical distribution system.

Referring to the schematic FIG. 1, the modular electrical distribution system 10 can include at least one circuit breaker panel 20, a plurality of prefabricated conductors 40 and prefabricated modules. Generally, power is conducted from the circuit breaker panel through a prefabricated conductor to a prefabricated module, wherein modules can be connected to further conductors or modules, or the user can interface directly with the prefabricated module.

Circuit Breaker Panel

Figure 2:
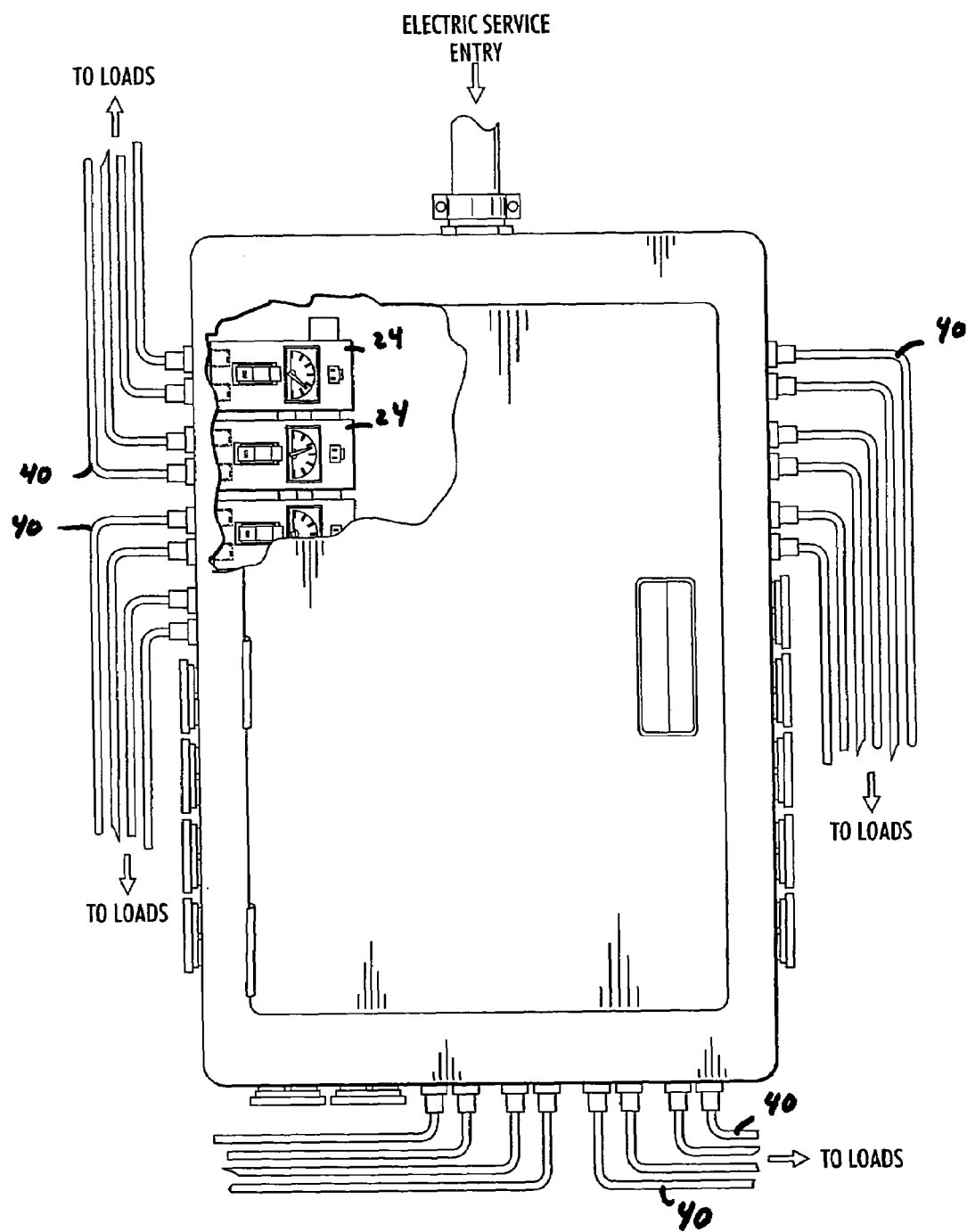
FIG. 2 is a schematic view of a circuit breaker panel.

Referring to FIG. 2, the circuit breaker panel 20 is operably connected to the electric service entry. The circuit breaker panel 20 includes a plurality of circuit breakers traditionally employed in circuit breaker panels. The circuit breaker panel further includes an ammeter 24 connected to each circuit breaker. Although a plurality of ammeters can be used in a one to one correspondence to the circuit breakers, it is understood that the ammeter can be selectively connected to a given circuit breaker to provide a measurement of current through a given circuit breaker. A female receptacle is connected to each ammeter and is exposed for interconnection to the prefabricated conductors 40.

In the prefabricated wiring of the circuit breaker panel 20, each circuit breaker is connected through a separate ammeter 24 to at least one (or a plurality) of the preinstalled electrical female receptacles. It is understood a single ammeter with selected switching to each circuit breaker can be employed instead of a separate ammeter for each circuit breaker. Each female receptacle provides a parallel circuit to the circuit breaker for connecting power to the remote loads within the building.

The ammeter 24 provides a readout, including a continuous readout of the electrical load on the given circuit breaker, to allow technicians or engineers to more efficiently employ the full potential of the breaker. It is further contemplated that taps can be included on the ammeters 24 for allowing connection to a recording device for remote monitoring or storing historical data.

Prefabricated Electrical Standard Length Conductors

Figure 3A:
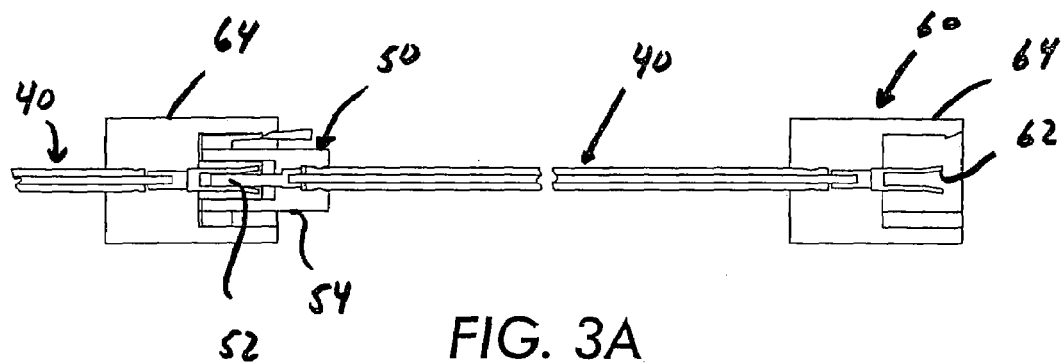
FIG. 3A is a cross-sectional view of a prefabricated standard length conductor interconnected with a second conductor.
Figure 3B:
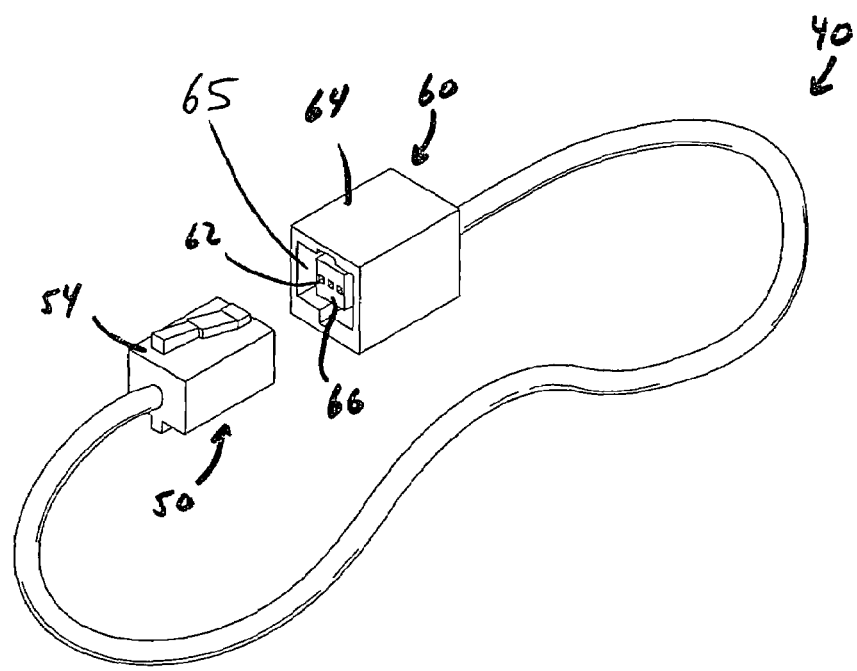
FIG. 3B is a perspective view of a prefabricated standard length connector.
Figure 4A:
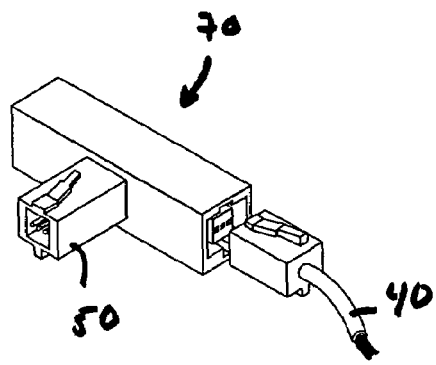
FIG. 4A is a perspective view of a "T" shape connector receptacle and conductor.
Figure 4B:
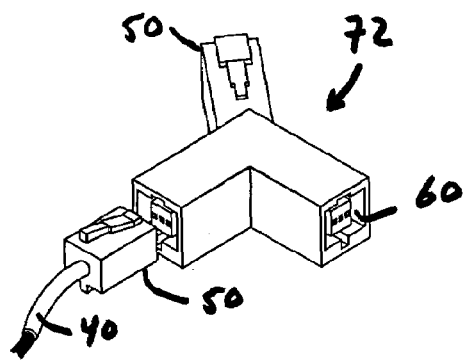
FIG. 4B is a perspective view of a "Y" shape or splitter connector receptacle and conductor.
Figure 4C:
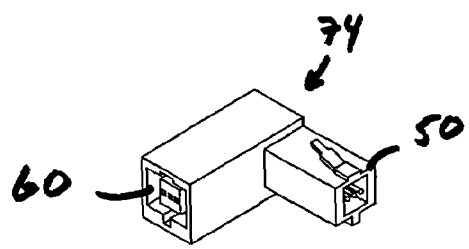
FIG. 4C is a perspective view of an "L" shape connector receptacle.
Figure 4D:
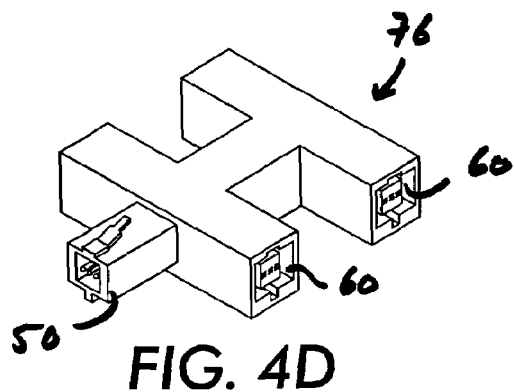
FIG. 4D is a perspective view of an "H" shape connector receptacle.
Figure 4E:
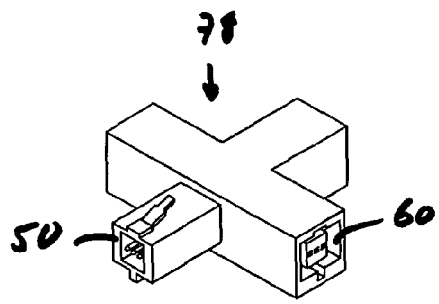
FIG. 4E is a perspective view of a "+" shape connector receptacle.
Figure 4F:
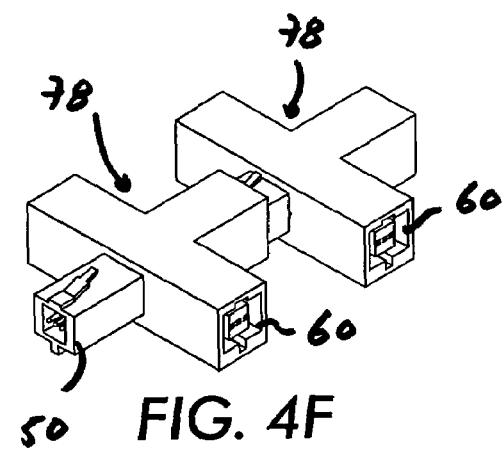
FIG. 4F is a perspective view of a representative ganging of connector receptacles.
Figure 4G:
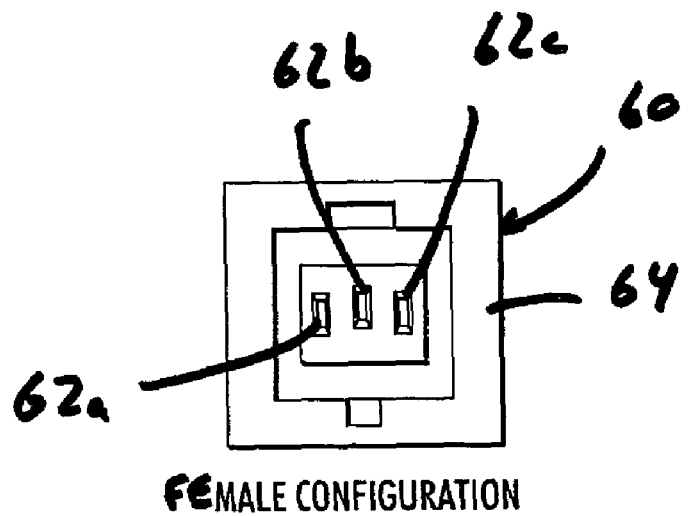
FIG. 4G is an elevational view of a male receptacle.
Figure 4H:
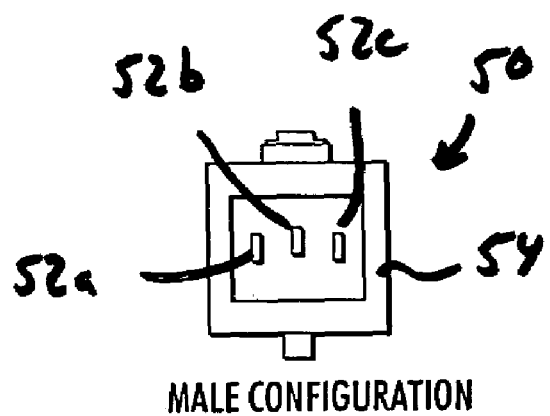
FIG. 4H is an elevational view of a female receptacle.

Referring to FIGS. 3A and 3B, the prefabricated standard length electrical conductor 40 is a manufactured component having a male receptacle 50 at one end and a corresponding female receptacle 60 at the remaining end. Although the electrical conductor 40 is shown as an integrated unit, it is contemplated that a female receptacle 60 of the present invention can be attached to existing wiring by traditional stripping and crimping, or alternative electrical/mechanical connection, to initiate formation of a parallel power circuit with existing circuit breakers.

The male receptacle 50 includes conducting blades 51a, 52b, 52c, wherein the blades are recessed to be at least substantially surrounded by an adjacent portion of the prefabricated conductor housing 54, thereby reducing exposure to the blades. However, it is understood that as the blades 52 are only energized upon being received within a corresponding female receptacle, such male receptacle can be formed in a non-recessed configuration. The preferred configuration joins the conductor to an energized component by connecting the male receptacle of the conductor into a female receptacle of the energized source. Thus, the blades are energized only upon engagement with the female receptacle.

Referring to FIGS. 3A and 3B, the female receptacle 60 is shown. The female receptacle 60 includes a female housing 64 having a socket 65 sized to receive at least a portion of the male housing. A standoff 66 is formed in the socket 65 and includes a corresponding number of sockets 62a, 62b, 62c to the blades 52a, 52b, 52c.

The female receptacle 60 and male receptacle 50 include cooperating fasteners such as tabs, tangs, or detents for retaining the receptacles in a cooperatively engaged orientation.

While the "standard length" of the conductors can be any of a variety of predetermined lengths, it is contemplated that lengths of 50, 25, 15, 6, and 0.5 feet would provide an adaptable system for accommodating most installations. However, it is understood the specific "standard lengths" can be determined by statistical analysis or feedback from installers. It is also contemplated that a prefabricated standard length conductor can be modified by cutting off the male receptacle and forming an "open" end. Such a modified conductor provides a starting point for adding parallel circuits with at least one connection to an existing electrical switch box or circuit breaker panel.

Preferably, each female/male receptacle interface is designed to substantially preclude unintended separation of the components. Thus, the operable interconnection of receptacles includes a detent, snap, finger, flap or tab interlocking connection, which requires a separate and independent motion to allow disconnecting the receptacles.

Prefabricated Electrical Connector

Referring to FIGS. 4A, 4B, 4C, 4D and 4E, it is contemplated the prefabricated standard length electrical conductors can include interconnecting conductors for corners or intersections, such as "T" 70, "Y" 72, "L" 74, "H" 76, and "+" conductors. However, additional shapes for conductors can be provided for dedicated circuit applications, such as but not limited to electric clothes dryers, electric ranges, and air conditioning units. As these conductors are preformed, the embedded electrical conducting elements can be formed to define a travel path having a radiussed path rather than sharp corners, thereby increasing the useful life of the article.

These shaped interconnecting conductors include at least one male receptacle 50 and one female receptacle 60. However, depending upon the specific configuration, the interconnecting conductor can include (i) a plurality of male receptacles 50 and a single female receptacle 60; (ii) a single male receptacle and a plurality of female receptacles; or (iii) a corresponding number of male and female receptacles.

It is also contemplated that the receptacles and/or connectors include a writing surface 68, wherein the writing surface provides for at least relatively permanent marking, thereby allowing recordal of an identification of a source control module for a given load. The writing surface 68 can be formed by surface treating a portion of the receptacle or module or by applying a permanent patch.

Further, the shaped conductors 70, 72, 74, 76, 78 can be used to form branch circuits from the circuit breaker panel 20 and can be routed to specific locations within the building. Combinations of the shaped connector receptacles can be used to conveniently form new parallel power circuits for specific locations within a building. For example, the "L" conductors 74 can be used at corners to join a piggyback linkage of conductors while the "+", "H", "T", and "Y" type conductors can form multiple branch circuits in a path different from previously installed wiring. The "Y" conductor can be used to connect to the circuit breaker female receptacle when a second circuit from the given circuit breaker has a path different from conductors previously connected to the circuit breaker receptacle. Alternatively, the "Y" conductor 72 can be employed at a location remote from the circuit breaker panel.

It is also contemplated the "H", "T", and "+" conductors can be used as a power junction box to form new parallel power circuits for a given circuit breaker, through the power outlet receptacles on the modules as described infra. For example, connecting one "+" conductor into the matching conductor attached to one end of a standard length conductor, or into either of a module power receptacle, will enable the formation of three additional branches. Inserting a second "+" conductor 78 in piggyback fashion to the first "+" conductor 78 increases the number of branch circuits to five.

The standard length conductors 40 have at least one male receptacle 50 and one female receptacle 60. The specific ratio of male to female receptacles can be varied depending upon the intended application. Each male receptacle 50 is configured to engage an upstream energized line, while the female receptacle 60 provides for downstream connection to an unenergized portion of the circuit.

Further, the prefabricated electrical standard length conductors 40 provide for continuity of electrical polarization having a unique or offset electrode configuration. Thus, the male and female receptacles can be operably interconnected in only a single predetermined orientation. As seen in FIGS. 3B and 4A–4H, the conductors and receptacles are configured to require the unique interconnection.

Prefabricated Modules

Each module 80 is a prefabricated assembly including the electrical and mechanical hardware components with associated circuitry and receptacles for power input, parallel power circuits, and load connections, encapsulated within a nonconductive material.

Each module 80 includes a housing 82 formed of nonconductive material, wherein the enclosed electrical and mechanical components are sealed within the housing. The housing 82 is formed so as to preclude non-destructive access to the interior of the housing. The housing 82 defines a sealed interior that precludes non-destructive access and includes an outer or exterior surface 85.

The mounting of the modules 80 is accomplished through either (i) a mounting flange 84 integrally formed as a portion of the housing 82, or (ii) a separate mounting bracket installed on the wall to which the module is secured. The integrally formed mounting bracket 84 can be designed to provide an aesthetically pleasing appearance and thereby replace traditional cover plates. In addition, the mounting flange can include fastening apertures 83 for receiving a fastener such as a nail or screw for retaining the receptacle relative to a mount. The modules 80 can be connected to the mounting bracket by any of a variety of mechanisms, including adhesives, thermal bonding and mechanical fasteners. Further, since the module is fabricated of relatively lightweight material, the module weight (and size) can be less than traditional electrical boxes, thereby enabling mounting at any point on a wall surface, and not constrained by building frame members such as studs or joists.

The modules 80 can be formed to provide a variety of functions including control 110, power 130, electromechanical connection 150, power junction box 170, single relay and multiple relays 190. The modules 80 can be formed to exhibit similar outer dimensions, thereby allowing standardization. Therefore, modules 80 can be of cylindrical form, which enables using a standard hole saw blade to form an opening for receiving the module.

Electrical Control Module

The control module 110 performs operations that respond to an external impulse. Single pole, double throw and push button switches, infrared and motion detection sensors for lighting, motors, printers, HVAC, and other electrical equipment are examples of a control module 110.

Figure 5:
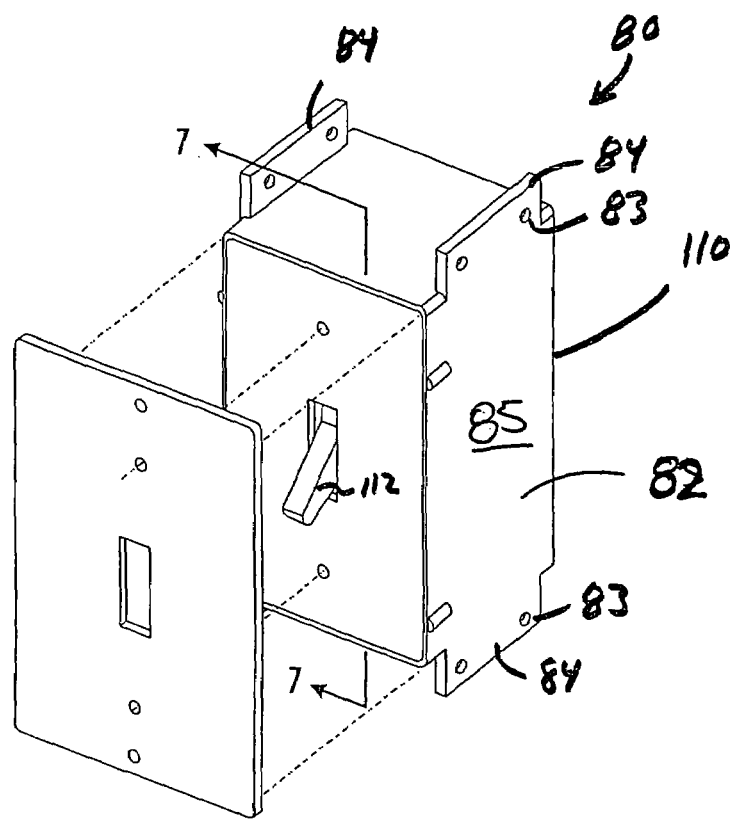
FIG. 5 is a front perspective view of a control module.
Figure 6:
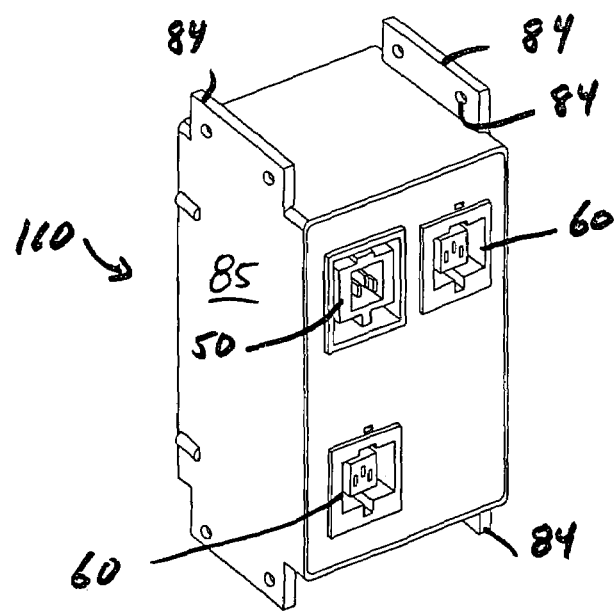
FIG. 6 is a rear perspective view of a control module.
Figure 7:
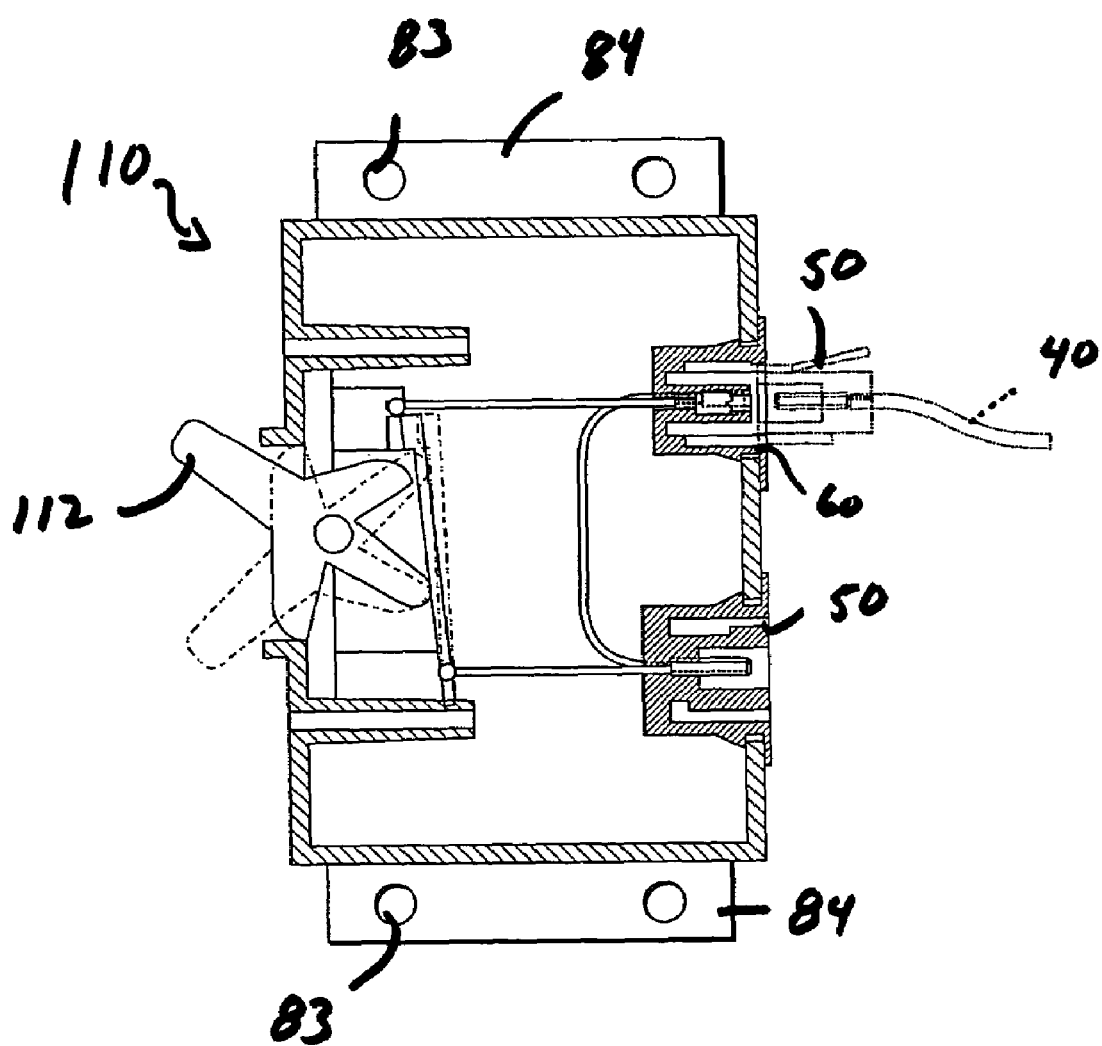
FIG. 7 is a schematic cross-sectional view of the control module.

Referring to FIGS. 5–7, the control module 110 forms a substantially rectangular volume having a front wall and a rear wall. However, it is understood the control module can have any of a variety of three-dimensional shapes, while providing the present functionality. As seen in FIG. 6, the rear includes a power input receptacle, a parallel power circuit receptacle, and at least one receptacle. The power input receptacle is a male connector 50, wherein the power input receptacle is sufficiently recessed such that the blades 52 of the male connector do not extend beyond the adjacent non-recessed portion of the rear wall. The parallel power breaker circuit receptacle is a female receptacle. Thus, preferably, load receptacles are female receptacles 60. Each of the receptacles can be two wire or three wire.

The front wall of the module 110 includes the operator/user interface, such as a switch lever 112 or slide or combinations thereof. The actual interface can be any of a variety of known constructions. The module 110 is formed such that all the receptacles and user interface are permanently affixed in the module, and non-destructive access to any circuitry between the components is precluded. FIG. 7 is a schematic cross-sectional view showing the internal structure of a representative control module 110. The power inlet receptacle and the parallel breaker circuit receptacle are directly interconnected. Any associated load receptacles are operably connected to a switch to selectively energize the load receptacle.

Further, it is understood for each module 80 that, while the components are described in terms of the front and rear of the module, the components could be located on any combination of top, bottom, left, right, front and rear.

Electric Power Module

Figure 8:
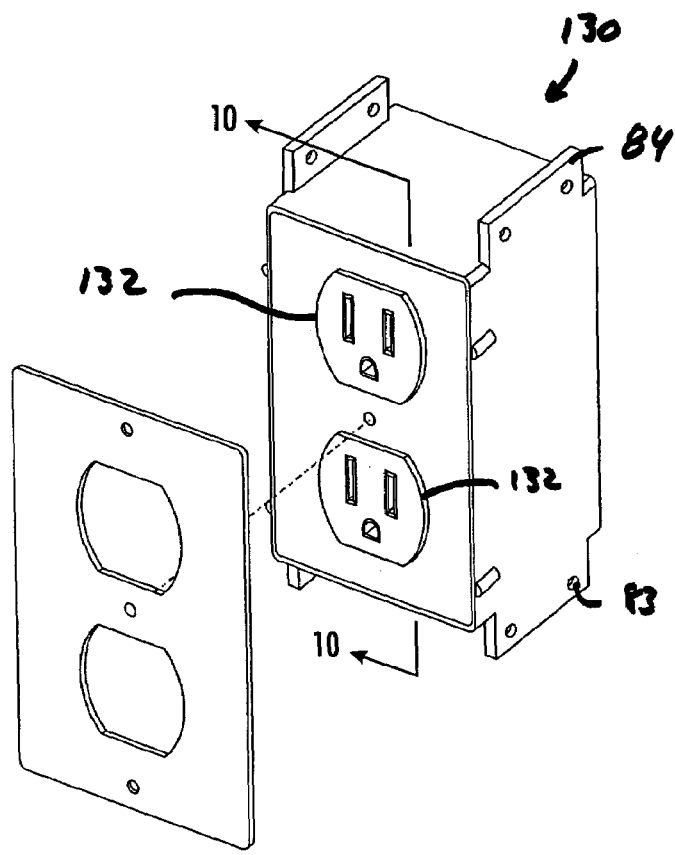
FIG. 8 is a front perspective view of a power module.
Figure 9:
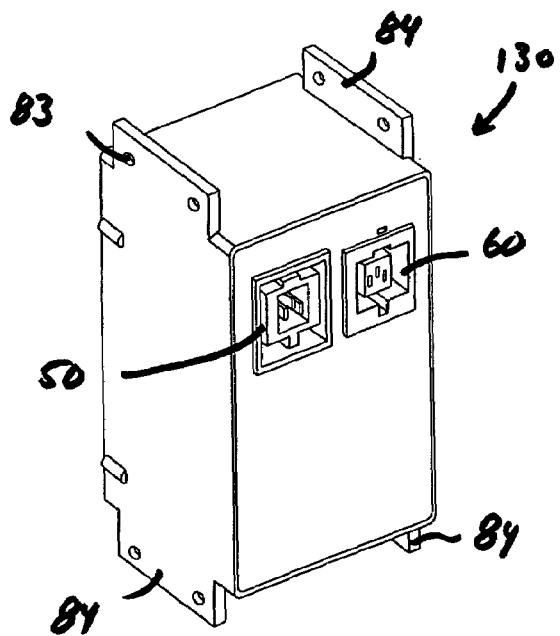
FIG. 9 is a rear perspective view of a power module.
Figure 10:
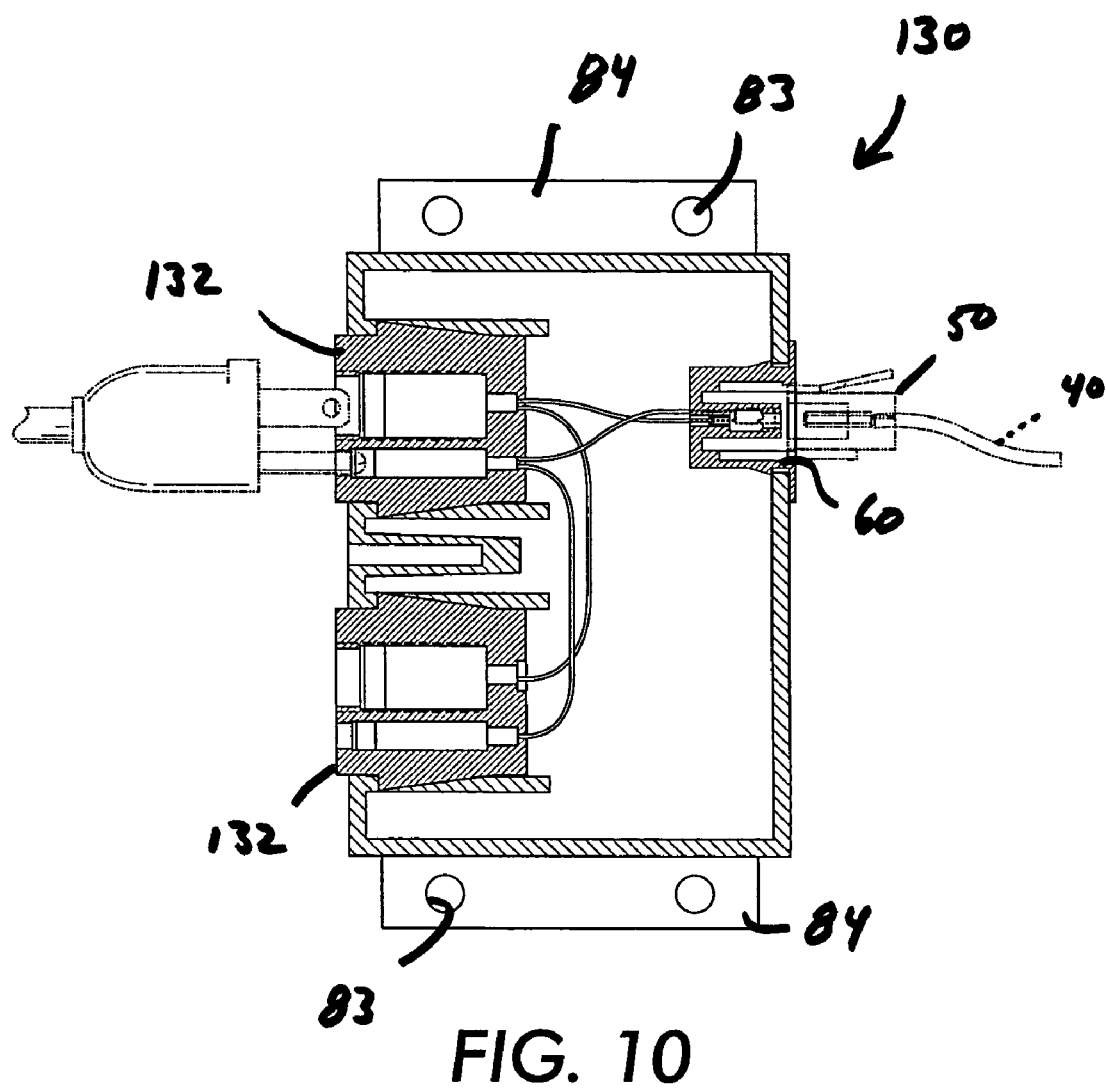
FIG. 10 is a schematic cross-sectional view of the power module engaging a standard load plug.

Referring to FIGS. 8 and 9, an electric power module 130 is shown, wherein the module defines substantially the same footprint as the control module 110. The power module 130 is defined as an electrical voltage outlet into which external equipment is connected through a power cord as seen in FIG. 10. A duplex outlet 132 in FIG. 8, clothes dryer special 220 volt receptacle and multi-electrode receptacle are examples of interfaces for a power module.

Referring to FIG. 9, the rear of the power module 130 includes a power input receptacle 50 and a parallel power circuit receptacle 60. The power input receptacle is a male connection, wherein the blades 52 are sufficiently recessed such that a free end of the blades is recessed from adjacent portion of the rear of the module. The parallel power circuit receptacle is a female receptacle.

Referring to FIG. 8, the front of the power module can include any of a variety of electrical interconnection interfaces such as a duplex electric range or appliance matching interface. Referring to FIG. 10, the operable interconnection within the power module 130 is shown, wherein the interface of the front of the module is connected to the power input receptacle and the parallel power circuit receptacle.

In those configurations, in which the mounting flange 84 is integrally molded to the housing, holes 83 are preferably formed in the flange for allowing mounting of the module to a wall.

However, it is contemplated that if a separate bracket is used for mounting, a threaded mechanical connector can be operably engaged with a corresponding threaded member in the housing.

The modules 130 can be operably mounted from the room side and can be assembled prior to or following installation of the wall. Further, as the modules 130 are formed of relatively lightweight material, the modules can be mounted to any building frame structure, such as the wall, and does not require connection to a frame member such as a stud or joist for support.

Electromechanical Interconnect Module

Figure 11A:
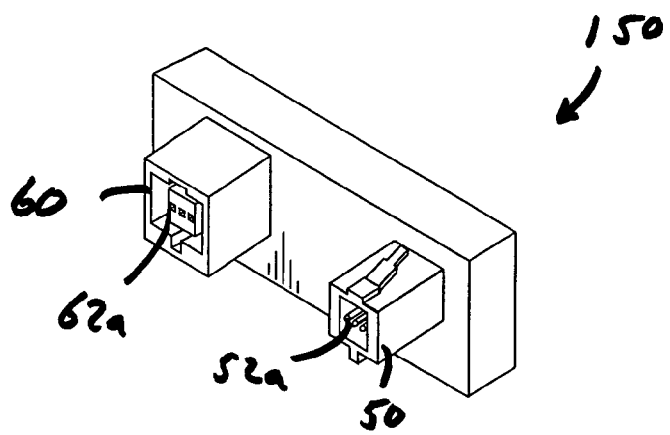
FIG. 11A is a front perspective view of an electromechanical connect module.
Figure 11B:
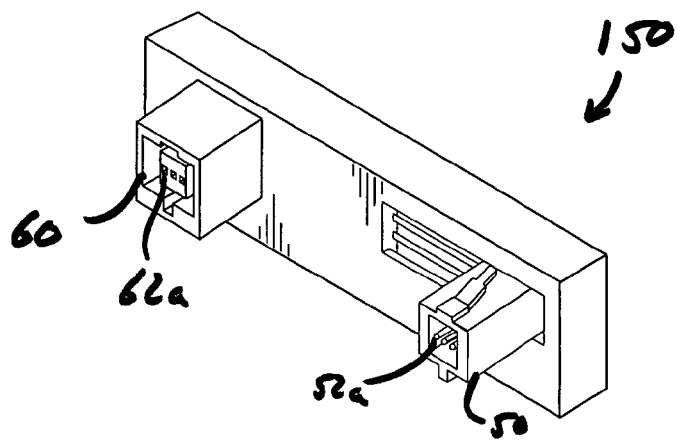
FIG. 11B is a perspective view of an adjustable electromechanical connect module.
Figure 12:
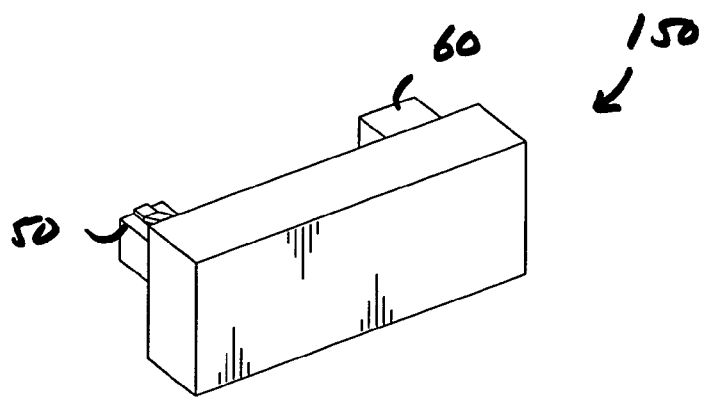
FIG. 12 is a rear perspective view of an electromechanical connect module.

As seen in FIGS. 11A, 11B, and 12, an electromechanical interconnect module 150 is shown. The electromechanical interconnect module 150 provides the ganging, or joining, of adjacent modules. Each electromechanical interconnect module 150 includes a male power input receptacle 50 and a female parallel power circuit receptacle 60 which are wired in parallel internal to the module. Again, as with all the modules, the interconnect module is integrally formed and sealed to preclude non-destructive access.

Preferably, the electromechanical interconnect module 150 is sized so that the distance between centers of the power input receptacle 50 and the parallel power circuit receptacle 60 is equal to the distance between ganged modules for common mounting.

Figure 13:
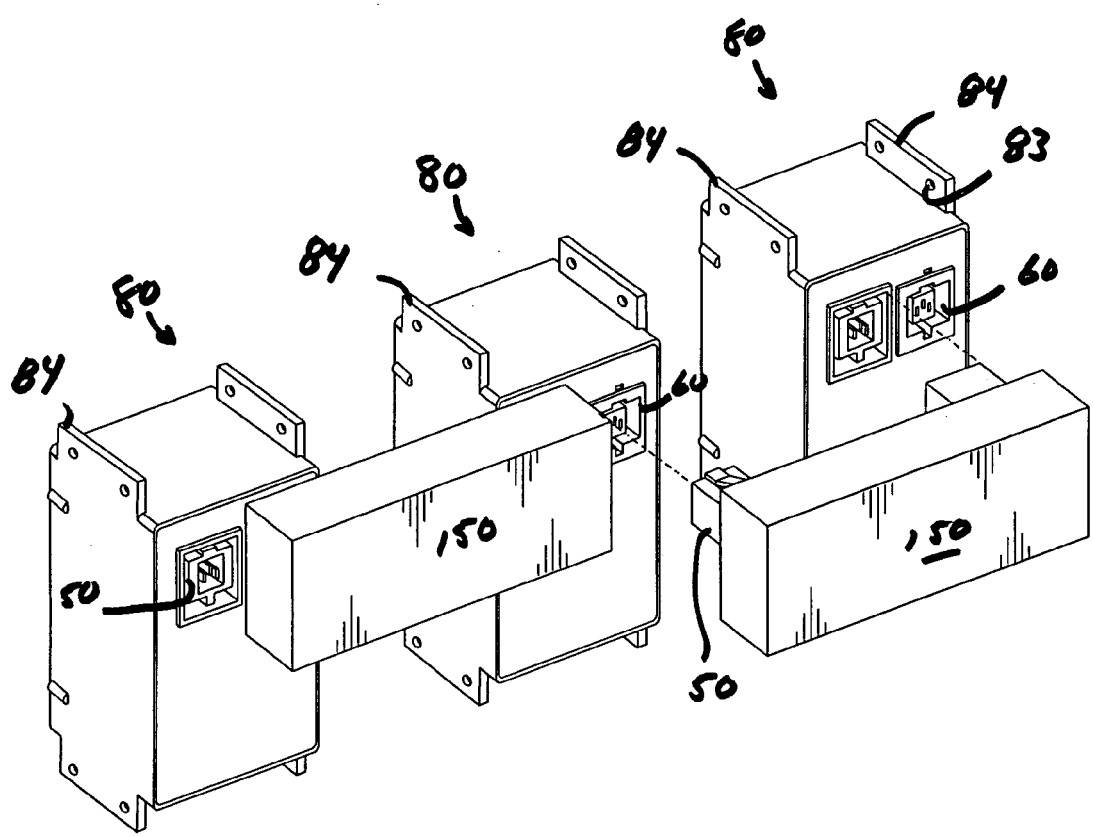
FIG. 13 is a perspective view of a pair of electromechanical connect modules and control/power modules in a ganged configuration.

However, referring to FIG. 11B, it is understood the electromechanical interconnect module 150 can allow for selectively varying the distance between the parallel power circuit receptacle 60 and the power input receptacle 50. For example, an conductive bus can be located within the interconnect module 150 such that at least one of the receptacles 50, 60 can be moved along the bus, while maintaining electrical contact, and secured in position. As seen in FIG. 13, ganging of two modules is accomplished by inserting the power input male receptacle of the electromechanical module into the parallel power (circuit breaker) female receptacle of the source module and inserting the electromechanical module parallel power circuit female receptacle into the ganged module power input male receptacle. Further, as seen in FIG. 13, ganging of additional modules 80, 150 is limited only by available space.

Power Junction Box Module

Figure 14:
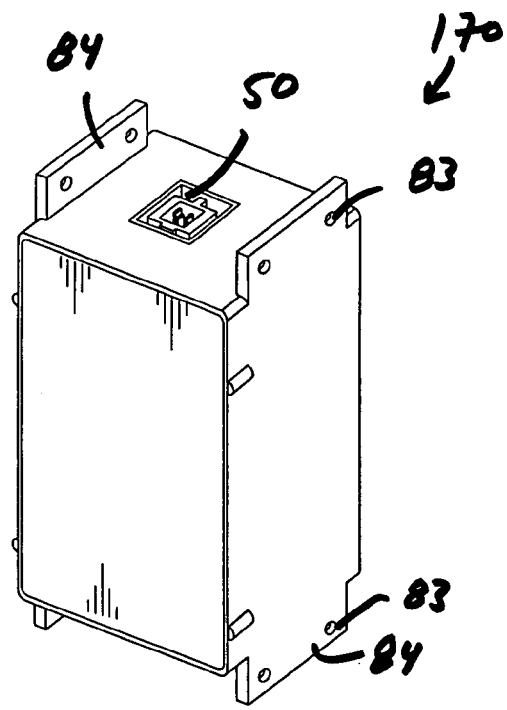
FIG. 14 is a front perspective view of a power junction module.
Figure 15:
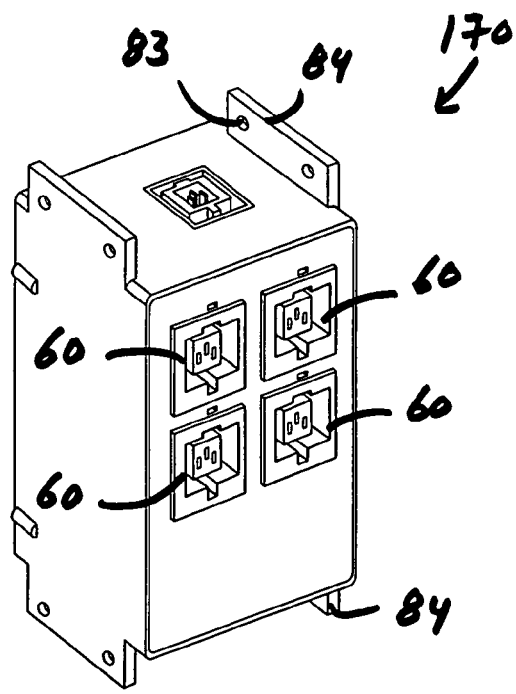
FIG. 15 is a rear perspective view of a power junction module.

Referring to FIGS. 14 and 15, a power junction module 170 is shown. The power junction module 170 provides the functionality of a traditional junction box, so as to provide a junction of wires within the housing so that one or more parallel circuits can be electrically connected to a given circuit breaker.

The power junction module 170 defines substantially the same footprint as the control and power modules. Referring to FIGS. 14 and 15, a top wall of the power junction module 170 includes one power input receptacle 50 and a rear wall includes a plurality of parallel power circuit receptacles 60, wherein the power input receptacle is a recessed male connector and the parallel power circuit receptacle(s) are female.

As previously discussed, it is contemplated various shaped connectors, such as the "H" conductor 76, can be employed to provide alternative electrical interconnections to the power junction box 170.

Relay Module

Figure 16:
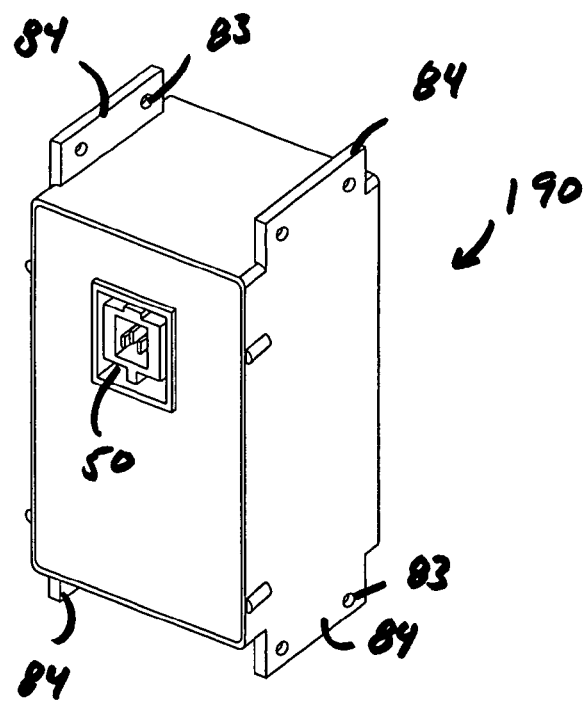
FIG. 16 is a rear perspective view of a relay control module.
Figure 17:
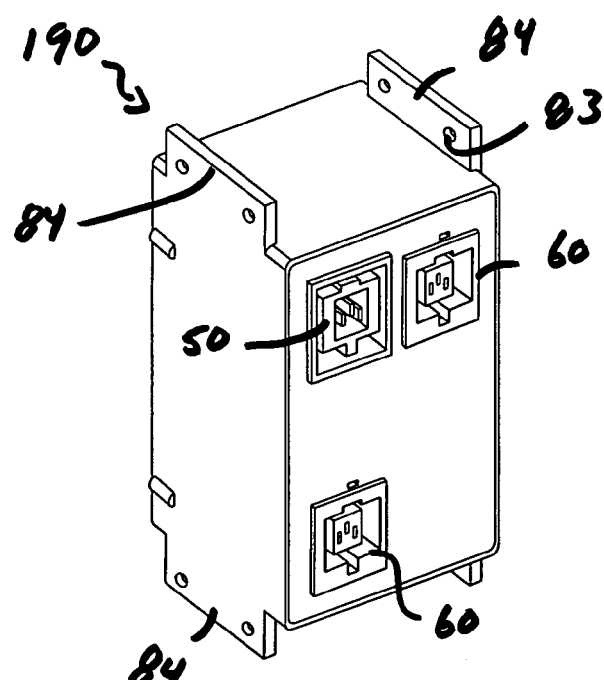
FIG. 17 is a front perspective view of a relay control module.

As seen in FIGS. 16 and 17, a relay module 190 is shown. The relay module 190 provides electric power control to selectively provide power to given loads from multiple remote control locations. Thus, a remotely located switch is used only to power a relay coil 192 within the module 190. Electricity to a load is thus provided through relay contacts 194, 196, which open/close in response to incidents of power applied to the relay coil from any of the connected remotely located controls.

An advantage of the relay configuration is that relay can be operably employed with only a two wire power system, rather than existing compound complex switch and wire configurations. Thus, the number of multiple remote controls connected to a given relay coil is infinite, when combinations of the shaped connectors are used to interconnect control modules and the coils of relay modules. Further, logic control of the preponderance of ceiling lighting fixtures in spacious commercial buildings can include relay control modules connected through a programmable (compute-aided or manual-operated) panel to individual or clusters of light fixtures. Thus, the lighting for the departments of a business can be programmed to be on/off over each area occupied by individual departments, based on the time schedule of operations (Day, Night, Variable schedule, etc). The relay logic system would also provide for reprogramming of lighting arrays that change when a building function changes. The large numbers of relay modules 190 anticipated for the light fixture relay logic control could warrant using a low voltage relay coil, which would enable reducing the gauge, with related reduced cost, of the conductors for relay coil circuits to about one-third of the gauge required for the normal building voltages. Therefore, the present invention includes an optional, low voltage installation intended for, but not limited to, relay coil power.

The relay module 190 has the footprint of the previously discussed control module 110 and junction box module 170. Further, referring to FIG. 17, a rear of the relay module 190 includes a power input receptacle, having a recessed male connector 50, at least one parallel power circuit receptacle 60 which is female, and at least one load receptacle 60 which is female. As seen in FIG. 16, the front of the relay module includes a recessed male relay coil power input receptacle 50. Encapsulated within the housing is at least one relay 192, with corresponding relay contacts 194, 196. Each relay includes a corresponding coil 192 within the housing, wherein the relay can be connected to multiple control switch sources external to the relay module. In contrast to modules normally mounted to a building surface, the relay modules 190 can be freestanding and located adjacent to, or as part of, a load configuration.

Figure 18:
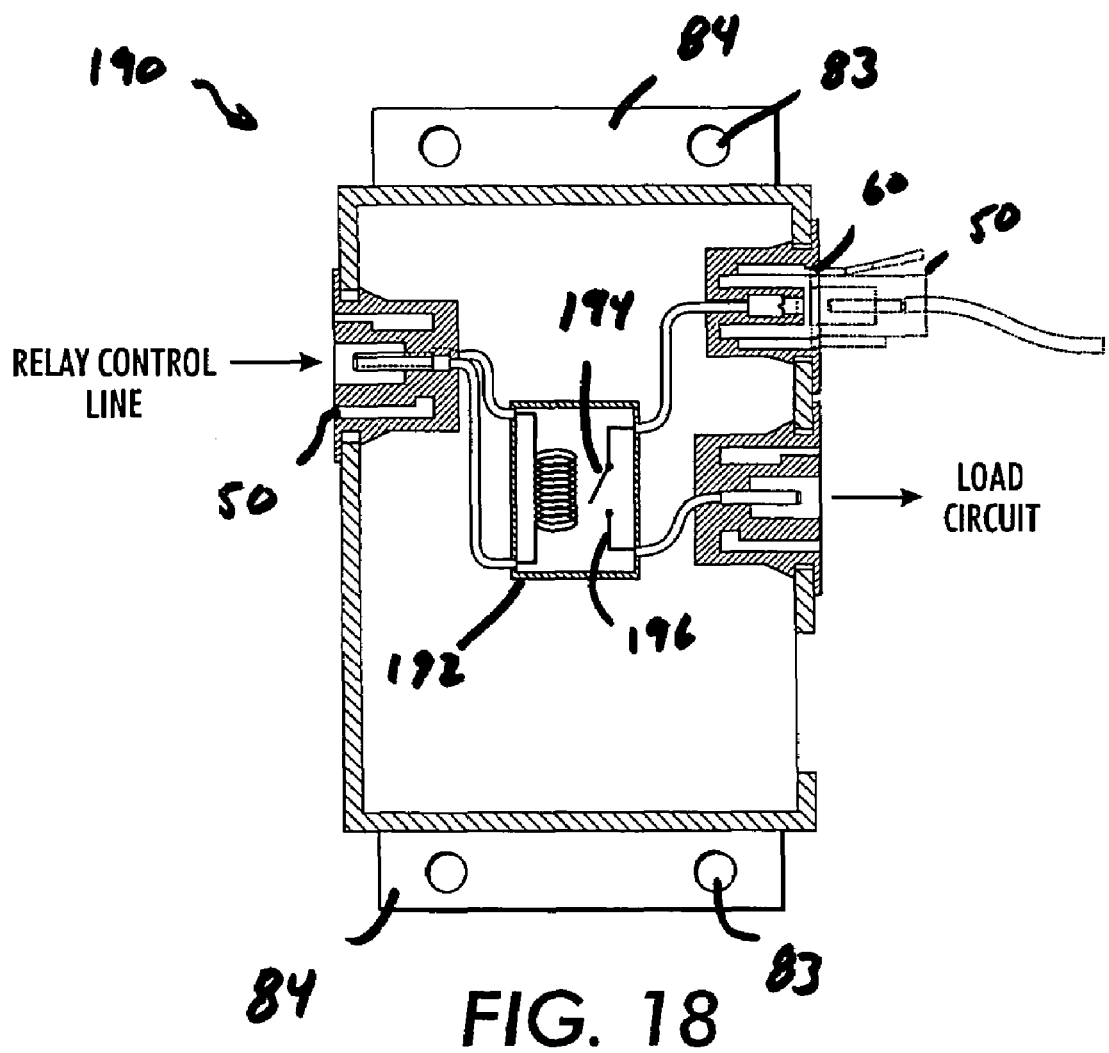
FIG. 18 is a schematic cross-sectional view of the relay control module.

Referring to FIG. 18, the power input receptacle 50 is electrically connected internal to the housing to an input side of the relay contacts. An output side of the relay contacts is electrically connected to a separate load receptacle. Multiple loads can be connected to a given relay through combinations of the shaped connectors.

The parallel power circuit receptacle is connected in parallel with the power input receptacle and is used to provide power for additional modules. Each relay module 190 also includes at least one relay coil receptacle. The relay coil receptacle can be connected to one or more remote switches through the shaped connectors and conductors to allow control of the load receptacle from multiple locations.

For example, the relay module 190 can be employed to control a hallway light by individual (spring-loaded) switches such as push button switches and for adjoining rooms or any other location in the buildings. Electrical power to the light is connected/disconnected through the relay in response to the state of the relay. Each remote switch provides power to the relay coil 192 to activate the relay contacts 194, 196, thereby allowing or preventing electrical current to flow to the hall light. Each switch is connected to the relay coil through one of a multiple receptacles on the relay module, which, as previously discussed, are electrically connected to the relay. Whenever any one of these switches is activated, the relay state is changed to connect/disconnect power to the load.

Conductor Pull Through Guides

Figure 19:
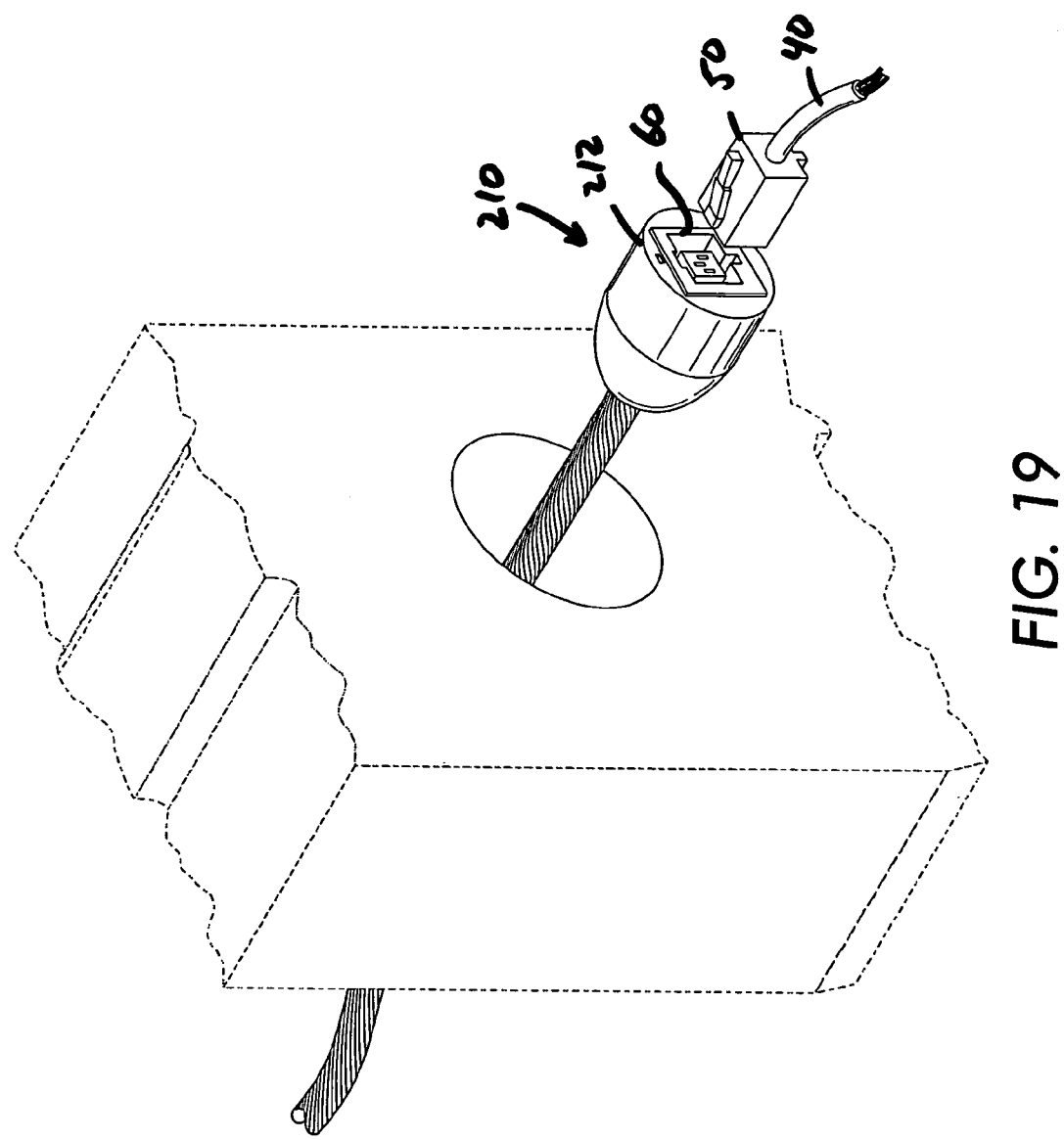
FIG. 19 is a perspective view of a conductor pull through guide.

As seen in FIG. 19, the present system further contemplates a conductor pull through guide 210 to facilitate routing of the prefabricated conductors 40 through holes and building components such as studs or joists. The conductor pull through guide 210 is a snubbed nosed plastic clamp 212, which is selectively attached to the respective connector of a prefabricated conductor 40. As previously described, the interconnection of these connectors precludes unintended separation, thereby allowing substantial tensile force. A hole in a forward part of the guide is tied to a pull string or rope. The string thus can be threaded along a desired path, thereby resulting in the prefabricated conductor 40 to follow the path, while the snubbed nose pull through guide 212 reduces snagging of the conductors.

Module Tester

A further aspect of the invention is directed to assuring quality control of the modules. As each module is prefabricated and precludes non-destructive access, the integrity of each module should be insured prior to installation. A module tester can be located at a retail sales site or an installation site to allow testing of each module prior to installation. The module tester can employ a low voltage source such as a battery and an indicator, either visual or sound, for testing the module. The modules can be selectively connected to the module tester through the respective receptacles to confirm proper functioning of the module prior to installation.

Installation

In contrast to prior requirements for installing a control duplex outlet power junction box, or other electrical switch boxes, which required loosening screws, stripping insulation, knocking out hole covers, installing clamps, routing conductors through the clamps, adjusting the clamps, inserting the wires, and reassembly, the present power module 130 can be installed by inserting the male receptacle connector 50 of a predetermined conductor length 40 into a mating female connector 60 on the circuit breaker panel 20.

The prefabricated conductor 40 is routed to the control, relay, or power module location in the building. The female receptacle 60 on the prefabricated conductor 40 is plugged onto the male power input receptacle on the power module 130. The module can then be (or is) mounted at a desired location to the wall, wherein the duplex power outlet is ready for use. Similarly, modules can be ganged (operably interconnected to another module) by inserting the electromechanical connection module power input male receptacle into the parallel power circuit female receptacle of the existing module and inserting the electromechanical connection parallel power circuit female receptacle into the power input male receptacle of the module to be ganged. The ganged modules 80 can thus be located at a desired location and ganging installation is complete.

Figure 20:
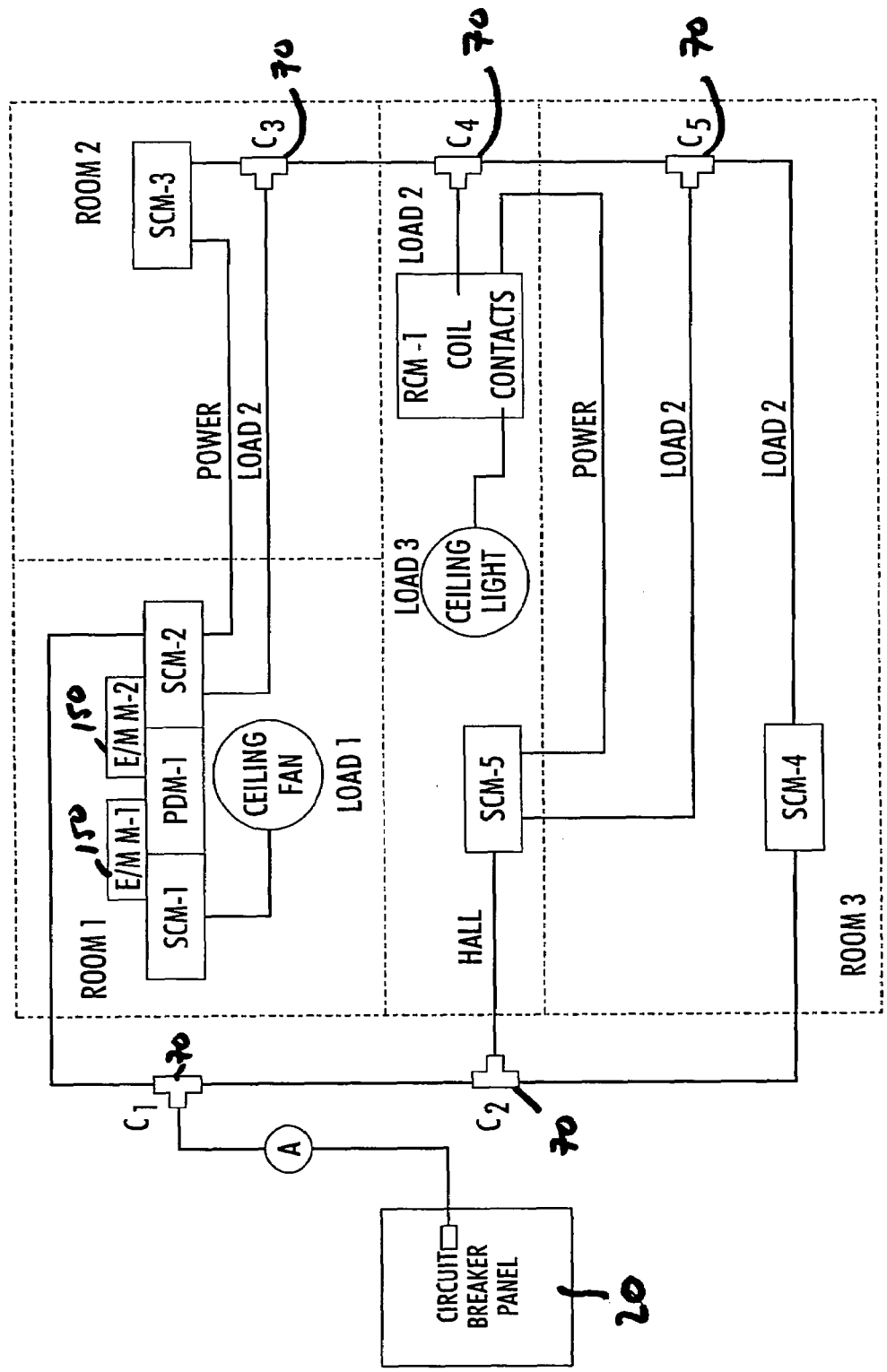
FIG. 20 is a schematic of a representative installation of the modular electrical distribution system.

FIG. 20 is a schematic diagram of the present components installed as part of the wiring for a three-room apartment bordered by an adjacent hallway.

The circuit breaker 20 is connected through the ammeter (A) to three loads and one duplex outlet. Load 1 is a ceiling fan in Room 1, controlled by control module SCM-1. Load 2 is a relay coil in relay module RCM-1, activated by any one of four remote located control modules, SCM-2 in Room 1, SCM-3 in Room 2, SCM-4 in Room 3, and SCM-5 in the Hall. Load 3 is a hall ceiling light which is switched on/off by power through relay contacts in RCM-1, in response to relay coil activation from Rooms 1, 2, 3, or Hall switch modules.

The power duplex outlet module, PDM-1 in Room 1, receives parallel power from the circuit breaker through the electromechanical control module E/M M-1, which gangs the parallel power circuit connector on SCM-2 to the power input connector on PDM-1. E/M M-2, a second electromechanical control module, forms another circuit breaker parallel power link by ganging the parallel power circuit connectors on PDM-1 with the power input connector on SCM-1, the ceiling fan control in Room 1.

Other parallel circuits for power and loads are formed through the "T" shaped connector receptacles C-1 through C-5.

The ammeter (A) in FIG. 20 registers real time electric current flow through the circuit breaker, which provides a means of efficiently using the breaker. As loads are added, the ammeter can be attached to a warning device that emits an audio or other signal when the current flow level approaches the breaker maximum current rating.

Wire splicing is unnecessary in making the connections in FIG. 20, as the system uses the invention standard length conductors 40 fitted with prefabricated connector receptacles to provide a plug-in form of assembly.

While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations as fall within the spirit and broad scope of the appended claims.

The invention claimed is:

1. A module for operable interconnection within an electrical system, the module comprising:
   (a) a housing defining an exterior and a sealed interior, the housing exterior including (i) a male power input receptacle having a plurality of blades, the blades being recessed relative to an adjacent portion of the housing, (ii) a female power output receptacle electrically interconnected with the male power input receptacle, and (iii) a female load receptacle electrically interconnected to the male power input receptacle and that receives a load to be powered by power input to the module via the male power input receptacle, the male power input receptacle being adapted to receive a female connector configured to be substantially the same as the female power output receptacle and the female power output receptacle being adapted to receive a male connector configured to be substantially the same as the male power input receptacle.

2. The module of claim 1, further comprising a user actuated switch, the switch operably interconnected to the load receptacle within the sealed interior to selectively electrically communicate the power input receptacle to the load receptacle.

3. The module of claim 1, wherein the plurality of blades includes three blades, each blade having a terminal ending recessed relative to the adjacent portion of the housing.

4. The module of claim 1, wherein the housing includes an integral projecting flange, the flange including at least one fastening aperture.

5. The module of claim 1, further comprising a relay within the housing and operably connected to at least one of the plurality of blades of the male power input.

6. The module of claim 5, wherein the relay is operably connected to a relay control line and a load circuit.

7. A fixed length conductor adapted for use with a module according to claim 1, the fixed length conductor comprising:
   an insulated elongate housing having three electrically spaced conductors extending along a length of the housing; and
   on an end of the elongate housing, one of the female connector substantially the same as the female output power receptacle and the male connector substantially the same as the male power input receptacle.

8. The fixed length conductor according to claim 7, wherein the fixed length conductor has a predetermined length between the female receptacle and the male receptacle.

9. The fixed length conductor according to claim 7, wherein the female connector is disposed on a first end of the elongate housing and the male connector is disposed on the second end of the elongate housing.

10. A modular wiring system comprising:
    at least one module according to claim 1;
    at least one fixed length conductor comprising an insulated elongate housing having spaced electrical conductors extending along a length of the housing and, on opposite ends of the elongate housing, the female connector substantially the same as the female output power receptacle and the male connector substantially the same as the male power input receptacle; and
    a circuit breaker panel receiving power from an electric service provider, the circuit breaker panel comprising at least one source female output power receptacle configured substantially the same as the female output power receptacle of the module,
    wherein the male connector of the fixed length conductor is operably interconnected with one of the at least one source female power output receptacle to convey electricity from the circuit breaker panel, and wherein the female connector is operably interconnected with the male power input receptacle to provide the electricity conveyed from the circuit breaker panel to the module.

* * * * *